United States Patent [19]

Wilm et al.

[11] Patent Number: 5,172,235
[45] Date of Patent: Dec. 15, 1992

[54] IMAGING SYSTEM FOR SIMULTANEOUS VIEWING OF TWO IMAGES

[75] Inventors: Thomas Wilm; Dirk Kügler, both of Wolfsburg, Fed. Rep. of Germany

[73] Assignee: Volkswagen AG, Fed. Rep. of Germany

[21] Appl. No.: 690,512

[22] Filed: Apr. 23, 1991

[30] Foreign Application Priority Data

Apr. 23, 1990 [DE] Fed. Rep. of Germany ....... 4012862

[51] Int. Cl.$^5$ ............................................. H04N 5/225
[52] U.S. Cl. .................... 358/226; 358/225; 358/108
[58] Field of Search ................. 358/225, 226, 55, 108, 358/213.26, 213.11; 350/317, 162.16, 311, 319

[56] References Cited

U.S. PATENT DOCUMENTS 3,612,764 10/1971 Gikeson ............................. 358/226
5,051,830 9/1991 Von Hoessle ....................... 358/209

Primary Examiner—Jeffery A. Brier
Assistant Examiner—Minsun Oh
Attorney, Agent, or Firm—Brumbaugh, Graves, Donohue & Raymond

[57] ABSTRACT

For simultaneous viewing, for example, of a stretch of roadway in front of a vehicle, with telephoto and wide-angle images, an electronic receiver receives telephoto and wide-angle image information from an input optical system. In one example, a telephoto lens and a wide-angle lens have individual zone filters whose transmissive regions are complementary to each other. The zone images are combined into a composite image for reproduction by the receiver.

4 Claims, 3 Drawing Sheets

IMAGING SYSTEM FOR SIMULTANEOUS VIEWING OF TWO IMAGES

BACKGROUND OF THE INVENTION

This invention relates to imaging systems for producing simultaneously two different images, such as wide-angle and telephoto images of the region in front of a vehicle.

In order to detect specific conditions and objects along a portion of a road to be traversed by a motor vehicle, it is necessary to use a relatively long focal length lens for proper recognition of obstacles and other objects. On the other hand, to follow the general course of the road and the immediately adjacent surroundings, a comparatively short focal length lens providing a wide viewing angle is required. The simplest solution to this problem would be to provide two separate cameras, one provided with a telephoto lens and the other with a wide-angle lens. Aside from the fact that such an arrangement would be inappropriate for standard equipment in vehicles from the standpoint of space and cost, separate interpreting circuits would also have to be provided to generate two different images.

SUMMARY OF THE INVENTION

Accordingly, it is an object of the present invention to provide an imaging system for simultaneous viewing of two images which overcomes the disadvantages of the prior art.

Another object of the invention is to provide a camera having moderate engineering and space requirements which will produce both a telephoto image of the roadway in front of a vehicle and a wide-angle image of the configuration of the road and its surroundings for a related image-reproducing system.

These and other objects of the invention are attained by providing an imaging system having an optical input arrangement for receiving both telephoto and wide-angle images and an image-reproducing system for reproducing from the optical input arrangement a single output image which contains both telephoto and wide-angle image information. In one embodiment, the optical input arrangement includes an optical component having varying focal length across a cross-section of its field of view providing both a telephoto input and a wide-angle input to the reproducing system.

In a preferred embodiment, which is favorable in terms of manufacturing cost, complementary zone filters are placed behind a telephoto lens and a wide-angle lens respectively, so that complementary, i.e., alternately successive, zones are masked out of the corresponding images and the transmitted zonal image elements are transferred by mirrors and collector lenses onto a single electronic receiver. Within the receiver, the image elements are scanned and reproduced as electrical signals which are supplied to a processing unit. Of course, it is also possible to combine the image elements into a single telephoto image and a single wide-angle image, each compressed in one direction, preferably in the vertical direction, and reproduced side-by-side, in which case there would be a sacrifice of resolution. Alternatively, however, the zone filters may be very small in width. The only limitation upon zone width is the need to mask out at least one scanning line at a time in the receiver.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
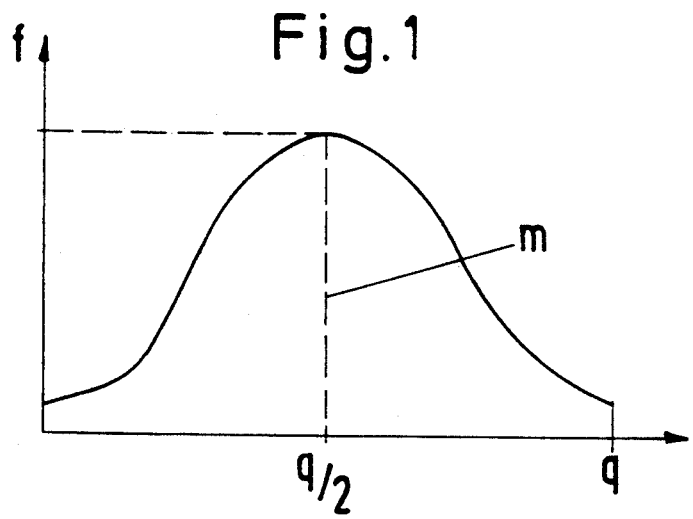
FIG. 1 is a schematic graphical representation of the change in focal length with horizontal position in a representative optical input arrangement for one embodiment of the invention.

Referring first to FIG. 1, the focal length f of a typical optical input system according to the invention is plotted against the horizontal position q in a combined telephoto and wide-angle lens for a dual imaging system. As shown in the graph, the focal length f has a maximum value in the neighborhood of the central axis m of the lens and it declines continuously to either side of the axis in a horizontal plane to a value corresponding to the desired wide-angle focal length of the lens.

Figure 2:
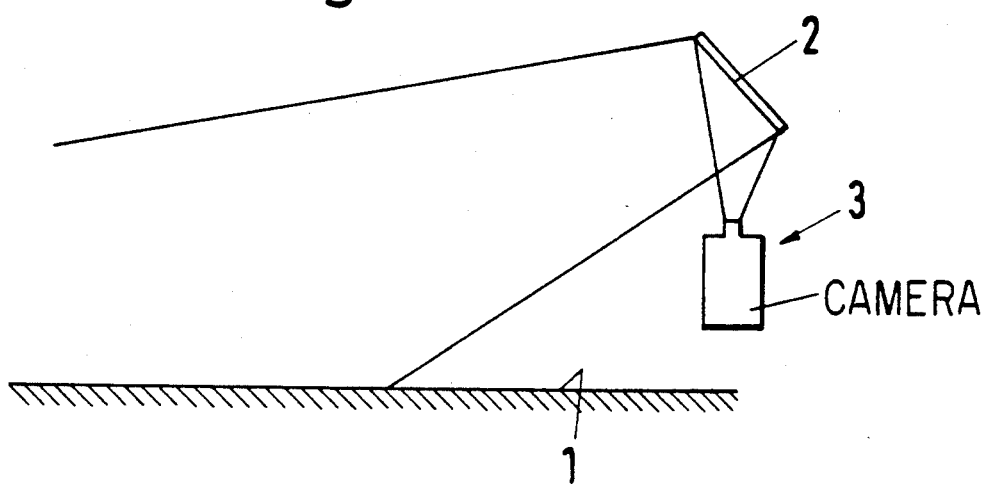
FIG. 2 is a schematic side view of a camera system according to another embodiment of the invention.
Figure 3:
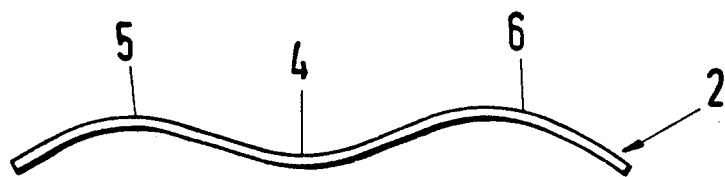
FIG. 3 is a top view of a mirror for use in the embodiment shown in FIG. 2.

FIG. 2 is a side view showing another embodiment of an imaging arrangement and a portion of a roadway 1 in front of a vehicle. The camera 3 includes a receiver having a CCD image sensor and the input optical system includes a specially shaped mirror 2. As shown in the side view of FIG. 2, the mirror 2 surveys a region of the road 1 located in front of the vehicle. The mirror 2, as seen in the top view in FIG. 3, is so shaped that it has a central region 4 which projects a telephoto image only of the portion of the road to be traversed onto the receiver In addition, two mirror regions 5 and 6 located on opposite sides of the central region 4 are so shaped that wide-angle images of the margins of the roadway and the adjacent regions are projected onto the same camera receiver.

Figure 4:
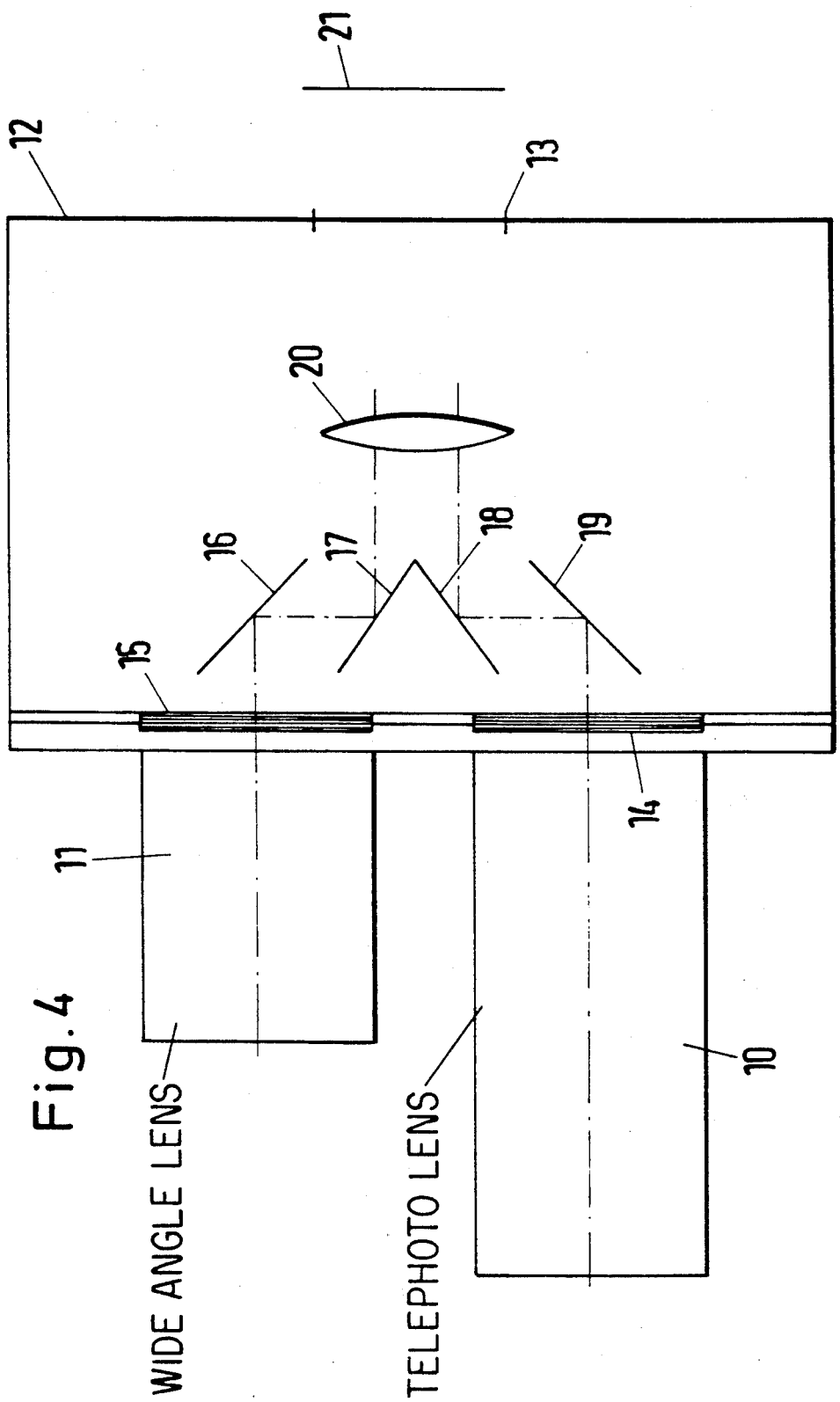
FIG. 4 is a schematic plan view showing the optical input arrangement in another embodiment of the invention.
Figure 5:
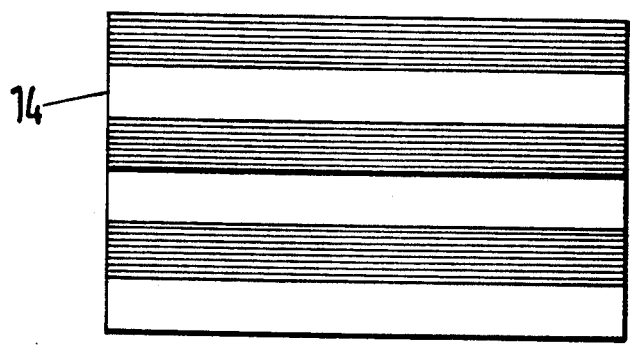
FIGS. 5 and 6 illustrate schematically the complementary zones of two images produced by zone filters used in the embodiment of FIG. 4.
Figure 6:
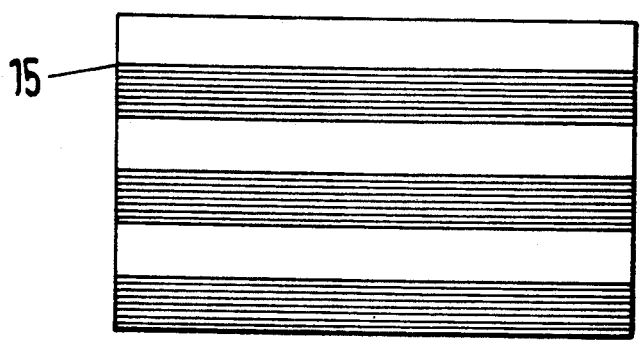

The two embodiments of the invention thus far described avoid a requirement for separate lenses for the telephoto and the wide-angle images, but they require a comparatively large manufacturing outlay for the input optical arrangement including complex lenses or mirrors to generate the two images. The exemplary embodiment of the invention described hereinafter with reference to FIGS. 4, 5 and 6 employs two lenses, i.e., a telephoto lens 10 and a wide-angle lens 11. These lenses are mounted in a parallel arrangement on an optical input housing 12 having a fitting 13 for connection to the camera containing a receiver, which again may be a CCD sensor. In the paths of the light rays from the two lenses 10 and 11, two zone filters 14 and 15 are mounted, respectively, the filters being provided with zones which are complementary to each other. This is shown by a comparison of FIGS. 5 and 6, where FIG. 5 represents the zone pattern of the filter 14, while FIG. 6 represents the zone pattern of the filter 15. As may be seen, the clear, transmissive filter areas and the shaded, opaque filter areas of the two filters 14 and 15 in FIGS. 5 and 6 are complementary.

The zonal images thus obtained are combined by four mirrors 16, 17, 18 and 19 and focused on a CCD sensor 21 by a collector lens 20. By conventional line-by-line scanning of the receiver in the direction parallel to the zones, the combined images from the two lenses are converted into electrical signals for processing in a related image-reproducing device.

The invention thus permits simultaneous imaging of an object field with a telephoto image and a wide-angle image without requiring two separate cameras.

Although the invention has been described herein with reference to specific embodiments, many modifications and variations therein will readily occur to those skilled in the art. Accordingly, all such variations and modifications are included within the intended scope of the invention.

We claim:

1. An image reproducing system for reproducing two images simultaneously comprising electronic image-reproducing means and optical input means providing optical image information to the reproducing means in which the optical input means includes an optical element having a central region and having a focal length which decreases continuously in the direction outwardly from the central region to provide simultaneous central telephoto and peripheral wide-angle optical image information to the reproducing means.

2. An image reproducing system according to claim 1 wherein the optical element having a focal length which decreases continuously from the central region outwardly is a lens.

3. An image reproducing system according to claim 1 wherein the optical element is a mirror which is shaped so as to produce telephoto optical image information in a central region and wide-angle image information outwardly from the central region.

4. An image reproducing system for reproducing two images simultaneously comprising electronic image-reproducing means and optical input means providing optical image information to the reproducing means in which the optical input means provides simultaneous telephoto and wide-angle optical image information to the reproducing means wherein the optical input means includes two separate lenses having parallel axes to produce two images and corresponding zone filters and mirrors to produce a composite image containing complementary zonal images.

* * * * *